US008736576B2

(12) United States Patent
Hayakawa (10) Patent No.: US 8,736,576 B2
(45) Date of Patent: May 27, 2014

(54) DISPLAY DEVICE HAVING TOUCH PANEL (75) Inventor: Kouji Hayakawa, Chosei (JP)

(73) Assignees: Japan Display Inc., Tokyo (JP);
Panasonic Liquid Crystal Display Co., Ltd., Hyogo (JP)

( * ) Notice: Subject to any disclaimer, the term of this patent is extended or adjusted under 35 U.S.C. 154(b) by 272 days.

(21) Appl. No.: 13/270,294

(22) Filed: Oct. 11, 2011

(65) Prior Publication Data
US 2012/0092292 A1   Apr. 19, 2012

(30) Foreign Application Priority Data
Oct. 14, 2010   (JP) .................................. 2010-231091

(51) Int. Cl.
*G06F 3/045*   (2006.01)
(52) U.S. Cl.
USPC .......................................................... 345/174
(58) Field of Classification Search
None
See application file for complete search history.

(56) References Cited

U.S. PATENT DOCUMENTS

| 7,030,860 | B1 |   | 4/2006  | Hsu et al. |         |
|-----------|----|---|---------|------------|---------|
| 8,194,044 | B2 | * | 6/2012  | Richter et al. | 345/173 |
| 8,330,734 | B2 | * | 12/2012 | Oohira | 345/173 |
| 2011/0069036 | A1 | * | 3/2011 | Anno | 345/174 |
| 2011/0285661 | A1 | * | 11/2011 | Hotelling | 345/174 |

FOREIGN PATENT DOCUMENTS

JP   2003-511799   3/2003

* cited by examiner

*Primary Examiner* — Adam R Giesy
*Assistant Examiner* — Henok Heyi
(74) *Attorney, Agent, or Firm* — Antonelli, Terry, Stout & Kraus, LLP.

(57) ABSTRACT

The present invention provides a display device having a touch panel including: a display panel; a capacitance-type touch panel arranged on the display panel; and a front panel arranged on the capacitance-type touch panel, wherein the capacitance-type touch panel includes a plurality of X-electrodes and Y-electrodes, the capacitance-type touch panel and the front panel are attached to each other at peripheral portions of the capacitance-type touch panel using adhesives, a conductive film that is provided so as to surround an effective touch area of the capacitance-type touch panel is provided on the uppermost layer of the capacitance-type touch panel, predetermined electric potential is supplied to the conductive film, and the conductive film overlaps peripheral portions of the effective touch area of the capacitance-type touch panel in planar view.

7 Claims, 9 Drawing Sheets

DISPLAY DEVICE HAVING TOUCH PANEL

CLAIM OF PRIORITY

The present application claims priority from Japanese Patent Application JP 2010-231091 filed on Oct. 14, 2010, the content of which is hereby incorporated by reference into this application.

BACKGROUND OF THE INVENTION

1. Field of the Invention

The present invention relates to a display device having a capacitance-type touch panel, and particularly to a technique that is effective in preventing false operations at peripheral portions of the touch panel.

2. Description of the Related Art

A display device equipped with a device (hereinafter, also referred to as a touch sensor or a touch panel) for inputting information on a display screen with a touch operation (touch and press operation, hereinafter, simply referred to as touch) using a finger of a user or a pen is used in mobile electronic devices such as PDAs and mobile terminals, a wide variety of home electric appliances, automated teller machines, and the like. There have been known a resistive film-type touch panel for detecting changes in resistance values at a touched portion, a capacitance-type touch panel for detecting changes in capacity at a touched portion, and an optical sensor-type touch panel for detecting changes in the amount of light.

For example, Japanese Unexamined Patent Application Publication No. 2003-511799 discloses such a capacitance-type touch panel. In the capacitance-type touch panel disclosed in Japanese Unexamined Patent Application Publication No. 2003-511799, electrodes (X-electrodes) for detection in the vertical direction and electrodes (Y-electrodes) for detection in the horizontal direction that are arranged in a two-dimensional matrix are provided to detect the capacity of each electrode with an input processor. In the case where a surface of the touch panel is touched with a conductor such as a finger, the capacity of each electrode is increased. Thus, the increase is detected by the input processor and the input coordinates are calculated on the basis of a signal of changes in capacity detected at each electrode.

As a general structure of a conventional capacitance-type touch panel, a front panel is entirely attached to a front surface of the capacitance-type touch panel using adhesives. The front panel is formed on the uppermost layer and is accordingly exposed. Thus, the front panel is scratched or tainted, and needs to be exchanged.

However, when exchanging the front panel, the touch panel also needs to be exchanged in the conventional structure. Thus, there have been requests to exchange only the front panel. In order to respond to the requests, it is only necessary to attach the front panel and the capacitance-type touch panel to each other only at peripheral portions, and thus only the front panel can be easily exchanged with this structure.

However, in the capacitance-type touch panel with the structure in which the front panel and the touch panel are attached to each other only at the peripheral portions, when the front panel is pressed relatively hard, the interval between the front panel and the touch panel becomes narrow or wide because the peripheral portions of the touch panel are fixed to the front panel using the adhesives.

In this case, the capacitance-type touch panel also detects changes in the thickness of an interval layer (a so-called air layer) between the front panel and the touch panel, and thus false reaction possibly occurs at the peripheral portions of the touch panel, leading to false operations.

SUMMARY OF THE INVENTION

The present invention has been achieved to solve the problems of the conventional technique, and an object thereof is to provide a technique enabling to prevent false operations at peripheral portions of a touch panel in a display device having a capacitance-type touch panel in which a front panel and the touch panel are attached to each other only at the peripheral portions.

The above and other objects and novel characteristics of the present invention will become apparent from the description of the specification and the accompanying drawings.

The followings are representative summarized aspects of the present invention disclosed in this application.

In order to achieve the above-described object, the present invention provides a display device having a touch panel including: a capacitance-type touch panel arranged on a display panel; and a front panel arranged on the capacitance-type touch panel, wherein the capacitance-type touch panel includes a plurality of X-electrodes and Y-electrodes, the capacitance-type touch panel and the front panel are attached to each other at peripheral portions of the capacitance-type touch panel using adhesives, a conductive film that is provided so as to surround an effective touch area of the capacitance-type touch panel is provided on the uppermost layer of the capacitance-type touch panel, predetermined electric potential (for example, ground electric potential) is supplied to the conductive film, and the conductive film overlaps peripheral portions of the effective touch area of the capacitance-type touch panel in planar view.

In the present invention, end portions of the conductive film where the peripheral portions of the effective touch area of the capacitance-type touch panel overlap are positioned within a range of 3 mm to 5 mm of the peripheral portions of the effective touch area of the capacitance-type touch panel in planar view.

In the present invention, wirings coupled to the plurality of X-electrodes and Y-electrodes are formed outside the effective touch area of the capacitance-type touch panel, and the end portions of the conductive film where the peripheral portions of the effective touch area of the capacitance-type touch panel overlap are positioned within a range of 5 mm from connection portions between the plurality of X-electrodes and Y-electrodes and the wirings in planar view.

In the present invention, the end portions of the conductive film where the peripheral portions of the effective touch area of the capacitance-type touch panel overlap are positioned within a range of 3 mm to 5 mm from the adhesives in planar view.

In the present invention, a slit is provided across the conductive film.

The followings are summarized effects obtained from representative aspects of the present invention disclosed in this application.

According to the present invention, it is possible to prevent false operations at peripheral portions of a touch panel in a display device having a capacitance-type touch panel in which a front panel and the touch panel are attached to each other only at the peripheral portions.

DETAILED DESCRIPTION OF THE EMBODIMENT

Hereinafter, an embodiment of the present invention will be described in detail with reference to the drawings.

It should be noted that constitutional elements having the same functions are given the same reference numerals in the all drawings for explaining the embodiment, and the explanations thereof will not be repeated. In addition, the following embodiment does not limit the constitution of the claims of the present invention.

Figure 1:
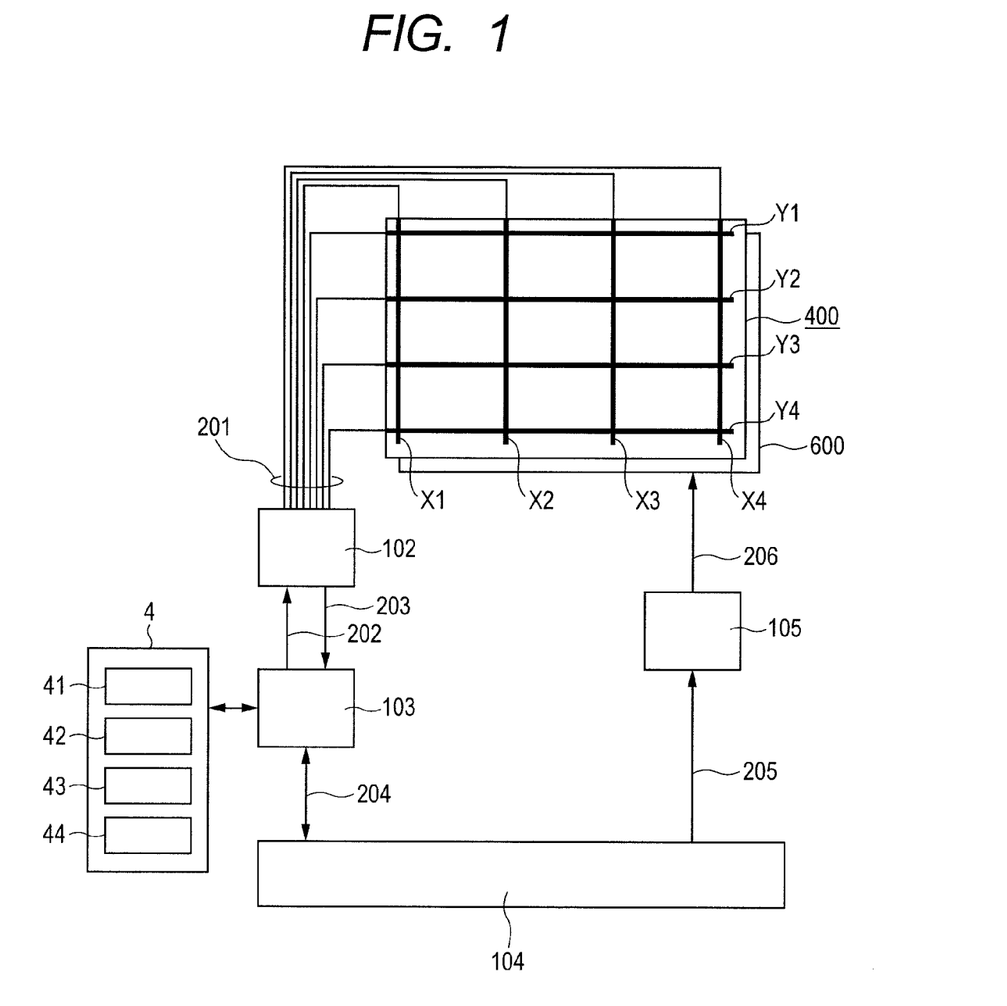
FIG. 1 is a diagram for showing an outline configuration of a display device having a touch panel according to an embodiment of the present invention.

FIG. 1 is a diagram for showing an outline configuration of a display device having a touch panel according to the embodiment of the present invention.

In FIG. 1, the reference numeral 400 denotes a touch panel. The touch panel 400 includes X-electrodes and Y-electrodes for detection of capacity. In the drawing, for example, four X-electrodes (X1 to X4) and four Y-electrodes (Y1 to Y4) are illustrated, but each number of electrodes is not limited to 4.

The touch panel 400 is installed on a front surface of a display device 600. Thus, when a user watches an image displayed on the display device 600, it is necessary to allow the displayed image to transmit through the touch panel 400. Accordingly, the touch panel 400 is desirably high in the light transmission rate.

The X-electrodes and the Y-electrodes of the touch panel 400 are coupled to a capacity detector 102 though detection wirings 201. The capacity detector 102 is controlled by a detection controlling signal 202 output from a controller 103. The X-electrodes X1 to X4 used as transmission electrodes (driving electrodes) sequentially apply pulses and the Y-electrodes Y1 to Y4 are used as reception electrodes to measure capacity between the electrodes at each intersecting point of the electrodes. A capacity detecting signal 203 that is changed depending on the capacitance value of each intersecting point between the electrodes is output to the controller 103.

As working data necessary for a touch detection process performed by the controller 103, a memory 4 records therein a reference value 41, a measured value 42, and a signal value 43 for each intersecting point between the electrodes (X-electrodes and Y-electrodes) and stores therein a touch status management table 44.

The reference value 41, the measured value 42, and the signal value 43 are two-dimensional sequence data in which the number of X-electrodes is the number of elements in the horizontal direction and the number of Y-electrodes is the number of elements in the vertical direction. The reference value 41 is data for recording the measured value 42 in a non-touched status. The signal value 43 is data calculated on the basis of the measured value 42 in the touch detection process. The touch status management table 44 is a table for storing touch coordinates and the like as touch detection results.

The controller 103 calculates each capacity between the electrodes using the capacity detecting signal 203 of each electrode, and obtains input coordinates by computation using each capacity between the electrodes. The controller 103 transfers the input coordinates to a system controller 104 using an I/F signal 204.

If the input coordinates are transferred from the touch panel 400 by a touch operation, the system controller 104 generates a display image in accordance with the touch operation to be transferred to a display controlling circuit 105 as a display controlling signal 205.

The display controlling circuit 105 generates a display signal 206 in accordance with the display image transferred by the display controlling signal 205, and displays the image on the display device 600.

Figure 2:
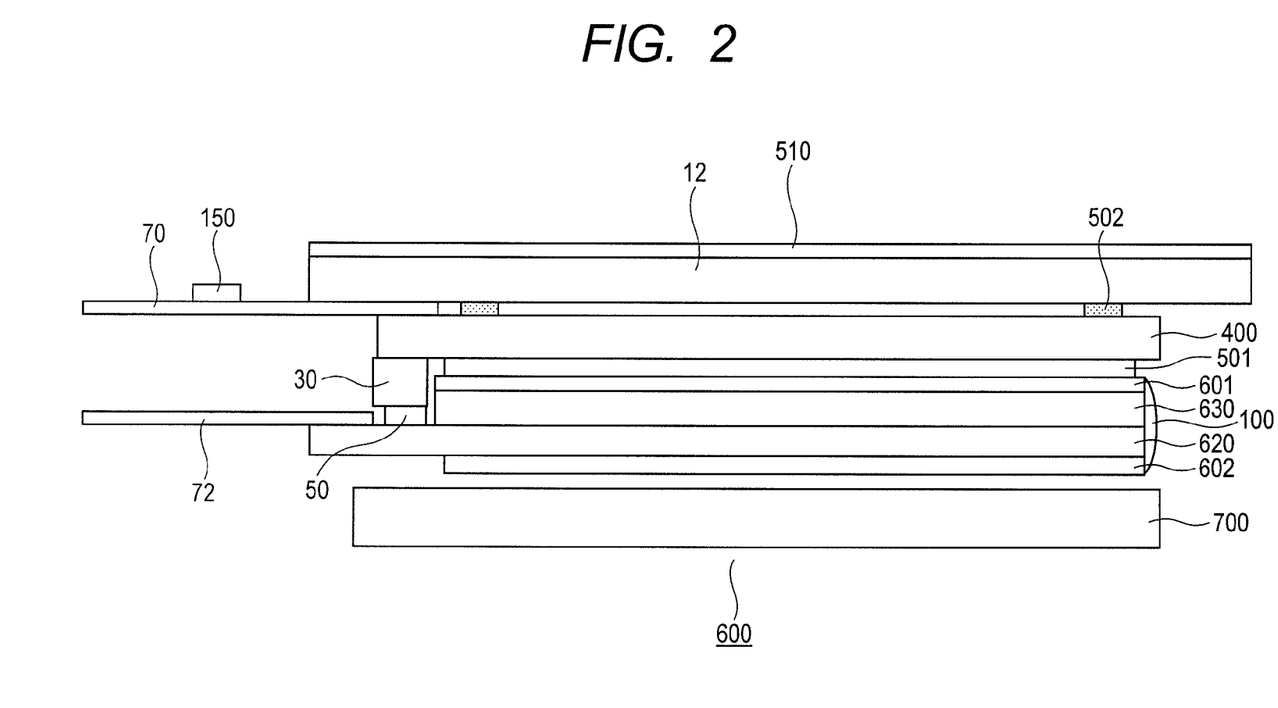
FIG. 2 is a cross-sectional view of main parts for explaining the display device having a touch panel according to the embodiment of the present invention.

FIG. 2 is a cross-sectional view of main parts for explaining the display device having a touch panel according to the embodiment of the present invention, and is also a diagram for explaining a multilayer structure in which a touch panel and a front panel are laminated on a display panel.

It should be noted that any display panel may be used as long as a touch panel can be used. In addition, the display panel is not limited to a liquid crystal display panel, but may be a display panel using organic light-emitting diode elements or surface-conduction electron-emitter elements, or an organic EL display panel.

As shown in FIG. 2, the display device 600 of the embodiment includes a liquid crystal display panel 100, the capacitance-type touch panel 400 that is arranged on the surface of the liquid crystal display panel 100 on the viewer side, and a backlight 700 that is arranged under the surface of the liquid crystal display panel 100 on the side opposite to the viewer side. As the liquid crystal display panel 100, for example, an IPS-type, a TN-type, or a VA-type liquid crystal display panel is used.

The liquid crystal display panel 100 is formed by attaching two substrates 620 and 630 that are opposed to each other, and polarization plates 601 and 602 are provided outside the two substrates.

Further, the liquid crystal display panel 100 is attached to the touch panel 400 using a first adhesive 501 made of a resin adhesive film. Furthermore, a front panel (also referred to as a front-face protection plate or a front window) 12 made of acrylic resin is attached outside the touch panel 400 using second adhesives 502 made of resin adhesive films.

Figure 3:
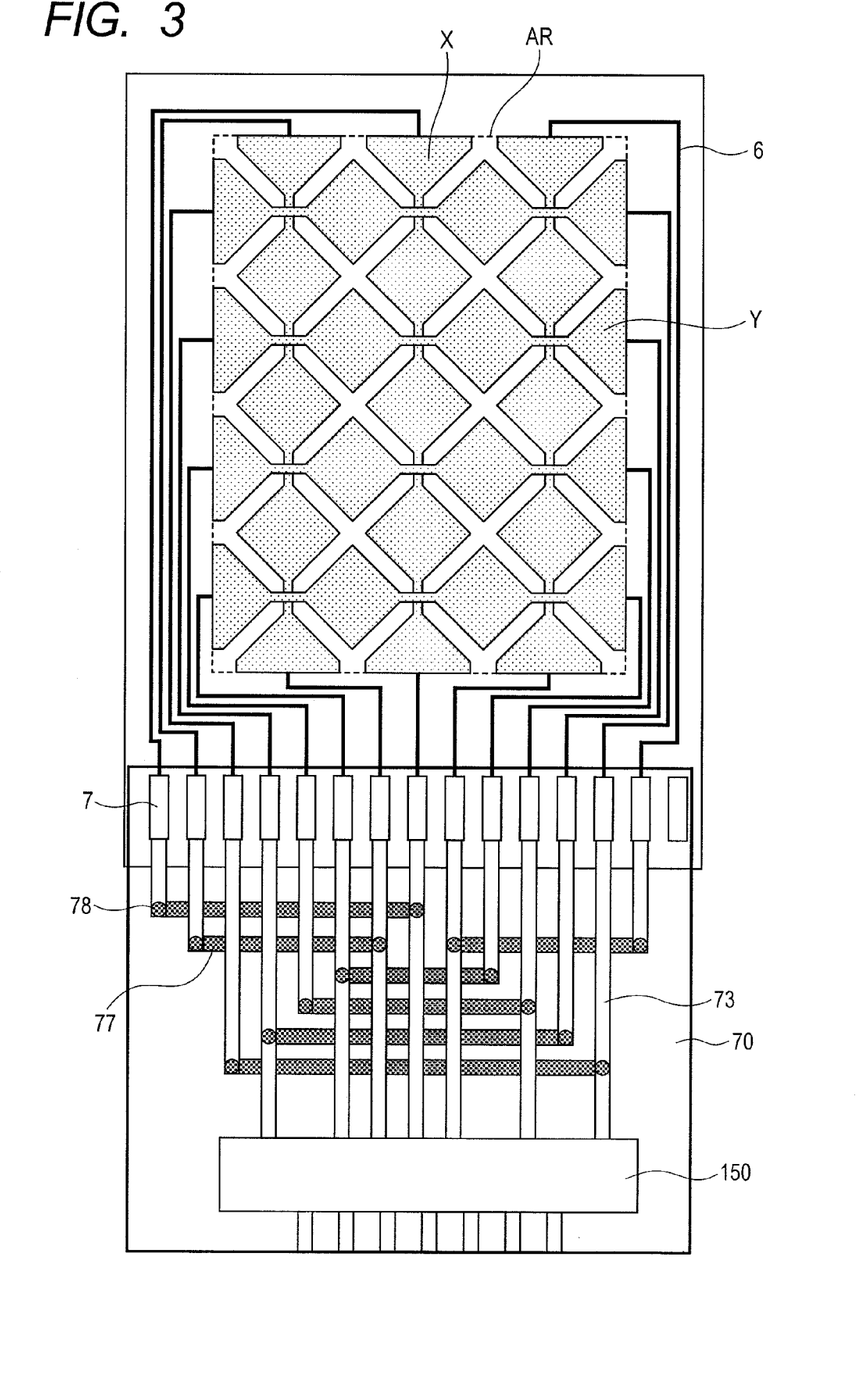
FIG. 3 is a diagram for showing a state in which a flexible print substrate is coupled to a touch panel.

FIG. 3 shows a state in which a flexible print substrate 70 is coupled to the touch panel 400. It should be noted that a shielding conductive film 38, to be described later, is not illustrated in FIG. 3.

A driving circuit 150 is mounted on the flexible print substrate 70, and a signal output from the driving circuit 150 is supplied to the touch panel 400 via the flexible print substrate 70. Detection of an input position and the like are controlled by the driving circuit 150. The memory 4, the capacity detector 102, and the controller 103 shown in FIG. 1 are provided in the driving circuit.

The signal output from the driving circuit 150 is supplied to wirings 73 on the flexible print substrate 70. Through-holes 78 are formed at the wirings 73, and crossed wirings 77 on the back face are electrically coupled to the wirings 73 via the through-holes 78.

Each of the crossed wirings 77 intersects with the plural wirings 73, and is coupled to the wirings 73 again via the through-hole 78 formed at the other end. Each of the crossed wirings 77 is orthogonal to the wirings 73 so as to minimize overlapped areas. It should be noted that the reference numerals 6 and 7 denote wirings and connecting terminals, respectively, in FIG. 3.

Further, AR denotes an effective touch area that is a touch detectable area when the touch panel 400 is touched with a finger, a conductive pen, or an insulating pen.

Further, a spacer 30 is inserted between the substrate 620 and the touch panel 400 in FIG. 2. A hybrid structure in which the touch panel 400 and the front panel 12 are combined with the liquid crystal display panel 100 has a problem that the substrate 620 of the liquid crystal display panel 100 is low in glass strength.

An area of the substrate 620 where a liquid crystal driving circuit 50 is mounted protrudes relative to the other substrate 630 to be formed as one substrate. The substrate 620 is possibly damaged at the area where the liquid crystal driving circuit 50 is mounted.

Therefore, the spacer 30 is inserted between the substrate 620 and touch panel 400 to improve the strength. It should be noted that a protective sheet 510 is provided on a front surface of the front panel 12 in FIG. 2 to prevent the front panel 12 from being scratched by a pen and the like.

The liquid crystal display device includes the liquid crystal display panel 100, the liquid crystal driving circuit 50, a flexible print substrate 72, and the backlight 700. The liquid crystal driving circuit 50 is provided at one side of the liquid crystal display panel 100, and supplies various signals to the liquid crystal display panel 100. The flexible print substrate 72 is electrically coupled to the liquid crystal driving circuit 50, so that signals are supplied from outside.

Although not illustrated in the drawing, the liquid crystal display panel 100 is configured in such a manner that: the substrate 620 (hereinafter, also referred to as a TFT substrate) on which thin-film transistors, pixel electrodes, opposed electrodes (common electrodes) and the like are formed is laminated on the substrate 630 (hereinafter, also referred to as a filter substrate) on which color filters and the like are formed with a predetermined interval; the both substrates are attached to each other through frame-like seal members (not shown) provided near edge portions of the both substrates; liquid crystal compositions are enclosed and sealed inside the sealed members; the polarization plates 601 and 602 are attached outside the both substrates; and the flexible print substrate 72 is coupled to the TFT substrate 620.

It should be noted that the embodiment can be similarly applied to a so-called transverse electric field-type liquid crystal display panel in which opposed electrodes are provided on the TFT substrate 620 and a so-called vertical electric field-type liquid crystal display panel in which opposed electrodes are provided on the filter substrate 630.

Figure 4:
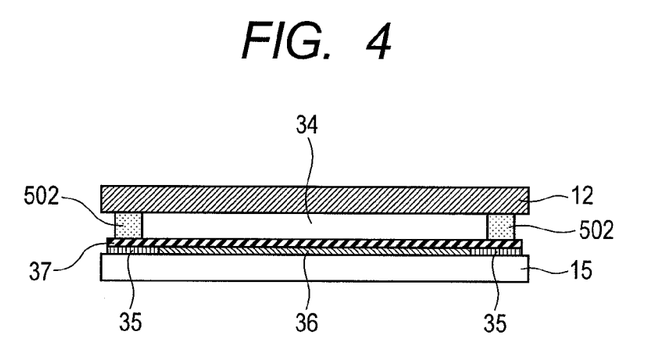
FIG. 4 is a cross-sectional view for showing an adhesion state between a front panel and the touch panel in a conventional display device having a touch panel.

FIG. 4 is a cross-sectional view for showing an adhesion state between the front panel 12 and the capacitance-type touch panel 400 in a conventional display device having a touch panel.

In FIG. 4, the reference numeral 12 denotes the front panel; 15, a touch panel substrate; 34 denotes an interval layer (air layer) between the front panel 12 and the capacitance-type touch panel 400; 35 denotes wiring portions at which the wirings 6 are formed; 36 denotes an electrode (X-electrode and Y-electrode) layer; and 502 denotes the second adhesives made of resin adhesive films.

In the conventional display device having a touch panel, only peripheral portions of the capacitance-type touch panel 400 and the front panel 12 are attached to each other using the second adhesives 502 in order to exchange only the front panel 12. Therefore, the interval layer (air layer) having a thickness of 0.2 mm to 0.4 mm is provided between the front panel 12 and the capacitance-type touch panel.

In such a touch panel, if a middle portion of the front panel 12 is pressed hard, the interval layer 34 corresponding to the pressed portion becomes narrow.

It should be noted that as illustrated in FIG. 4, the wiring portions 35 at which the wirings 6 for coupling the electrodes (X-electrodes and Y-electrodes) in the effective touch area AR to the connecting terminals 7 are arranged are provided at peripheral portions of the capacitance-type touch panel 400. The second adhesives 502 are provided on the wiring portions 35, and the wiring portions 35 are required to be as narrow as possible because the wiring portions 35 become ineffective areas in touch detection. Therefore, intervals between the second adhesives 502 and the effective touch area AR are narrow in general.

Figure 5:
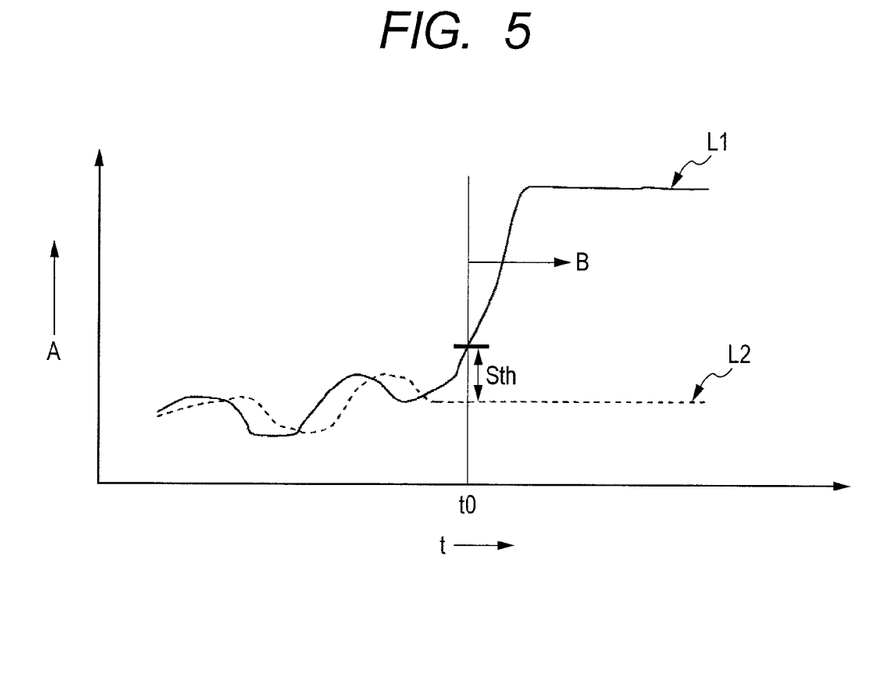
FIG. 5 is a graph for explaining a principle of a touch detection method in the conventional display device having a touch panel.

FIG. 5 is a graph for explaining a principle of a touch detection method in the conventional display device having a touch panel.

In FIG. 5, the horizontal axis represents time (t) and the vertical axis represents a measured value (a digital value obtained by converting a measurement result of the capacitance value between the electrodes from analog to digital). It should be noted that L1 and L2 represent a measured value and a reference value, respectively, in FIG. 5. In addition, an area indicated by an arrow B from time t0 in FIG. 5 represents an area detected as touched. In the capacitance-type touch panel 400 of the conventional display device having a touch panel, pulses are sequentially applied from the X-electrodes X1 to X4, and the reference value L2 is calculated from the measured value L1 of the capacity between the electrodes at each intersecting point of the electrodes received by the Y-electrodes Y1 to Y4, so that whether or not the panel has been touched is detected. This scheme prevents false operations even if the capacity between the electrodes at each intersecting point of the electrodes is changed due to temperature and humidity.

In the calculation method of the reference value L2, it is determined in each scan whether the measured value L1 of the capacity between the electrodes at each intersecting point of the electrodes is larger (obviously, smaller than a threshold value Sth) than the current reference value, or smaller. In the case where the measured value L1 of the capacity between the electrodes at each intersecting point of the electrodes is larger than the current reference value, a counter for counting up the reference value is up. In addition, when the counter reaches a predetermined counter, the reference value is updated to a value larger than the current reference value.

Further, in the case where the measured value L1 of the capacity between the electrodes at each intersecting point of the electrodes is smaller larger than the current reference value, a counter for counting down the reference value is up. In addition, when the counter reaches a predetermined count, the reference value is updated to a value smaller than the current reference value.

If the front panel 12 is touched with a finger, a conductive pen, or an insulating pen, the capacity between the electrodes at the touched portion is rapidly increased. In addition, the measured value L1 of the capacity between the electrodes at the touched portion exceeds the threshold value (Sth) set by the reference value L2 to be detected as touched, and the update of the reference value L2 is stopped.

In the conventional display device having a touch panel, even if a middle portion of the front panel 12 is pressed hard with a finger, a conductive pen, or an insulating pen and the air layer as the interval layer 34 becomes narrow at the touched portion, the reaction similar to that in FIG. 5 can be observed.

As described above, if a middle portion of the front panel 12 is pressed hard in the conventional display device having a touch panel, the interval layer 34 becomes narrow at the touched portion. However, since the peripheral portions of the touch panel and the front panel 12 are attached to each other using the second adhesives 502, changes of the interval layer 34 are limited.

Therefore, if a middle portion of the front panel 12 is pressed hard, the interval layer 34 becomes wide at the peripheral portions to cause false operations in some cases.

Hereinafter, the foregoing problems will be described using FIG. 6.

Figure 6:
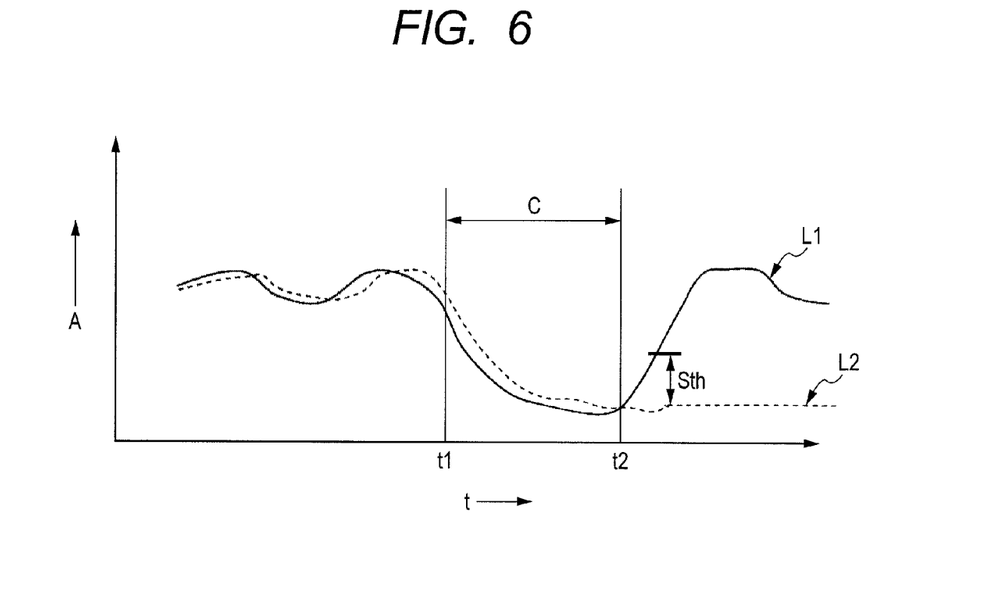
FIG. 6 is a diagram for explaining false operations at peripheral portions in the conventional display device having a touch panel.

FIG. 6 is a graph for explaining false operations at the peripheral portions in the conventional display device having a touch panel. It should be noted that the horizontal axis represents time (t) and the vertical axis represents a measured value (a digital value obtained by converting the measured value of the capacitance value between the electrodes from analog to digital) in FIG. 6. Further, an area C in FIG. 6 represents a period in which the interval layer 34 becomes wide.

As shown in FIG. 6, if the interval layer 34 becomes wide at the peripheral portions, the capacitance value between the electrodes appears to be reduced when viewed from the driving circuit 150, and the measured value L1 is decreased. The reference value L2 is accordingly decreased.

However, when the strong pressing force applied at the middle portion of the front panel 12 is released and the thickness of the interval layer 34 at the peripheral portions is quickly returned to the original thickness, the measured value L1 is rapidly increased to exceed the threshold value Sth set by the reference value L2, and the update of the reference value L2 is stopped, resulting in false recognition as touched.

Therefore, although the peripheral portions of the front panel 12 are not touched with a finger of a person, the peripheral portions of the front panel 12 are always recognized as touched.

[Characteristics of the Embodiment of the Present Invention]

Figure 7:
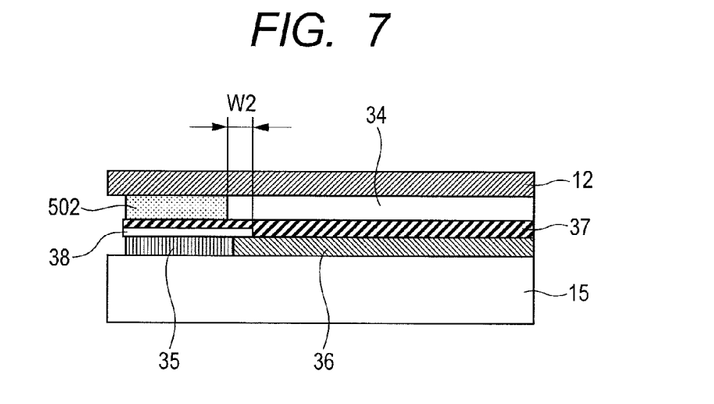
FIG. 7 is a cross-sectional view for showing an adhesion state between the front panel and the touch panel in the display device having a touch panel according to the embodiment of the present invention.
Figure 8:
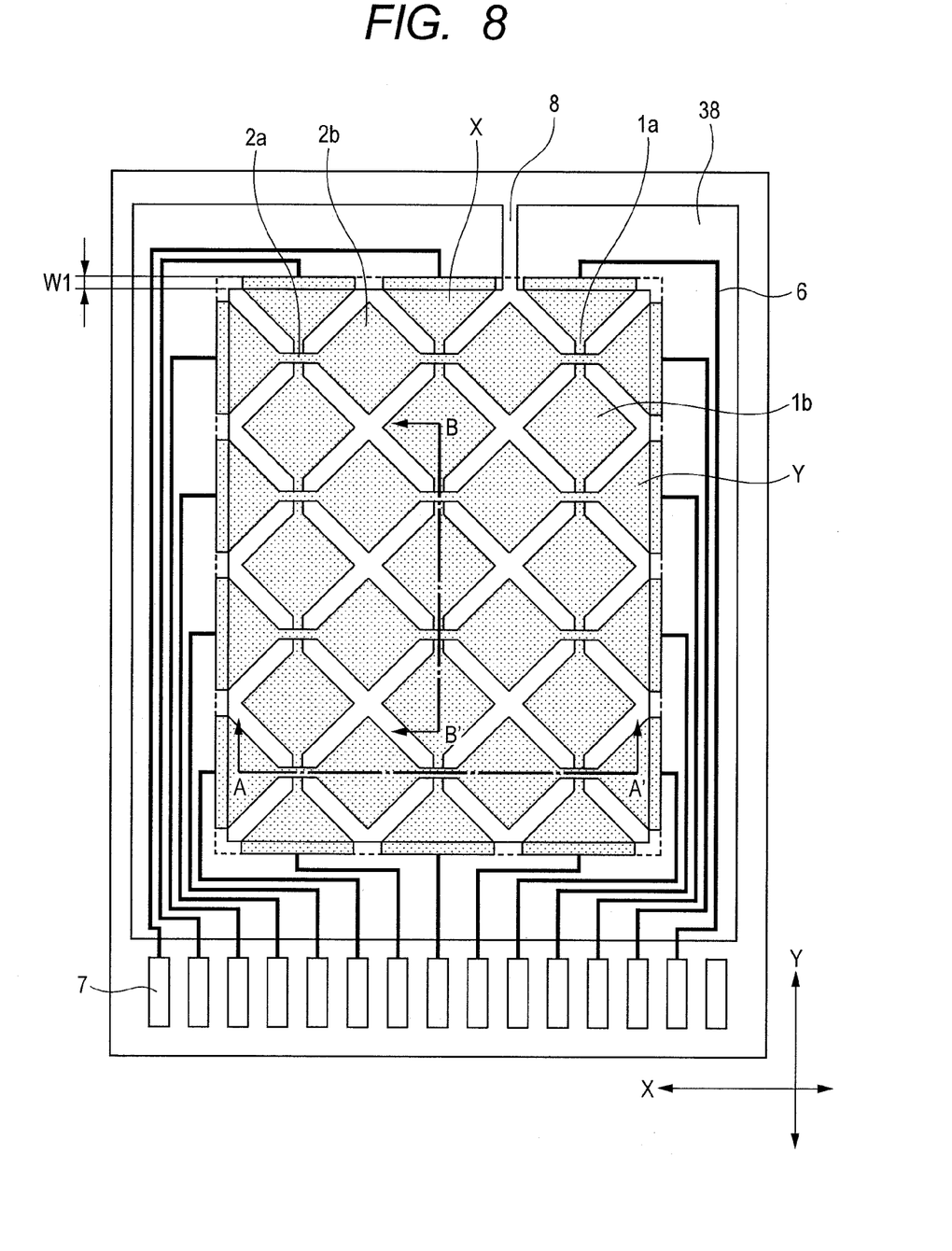
FIG. 8 is a plan view for showing an electrode pattern of the capacitance-type touch panel in the display device having a touch panel according to the embodiment of the present invention.

In order to prevent the above-described problems, the shielding conductive film 38 to which predetermined electric potential is supplied is provided on the top surface of the touch panel 400 near the second adhesives 502 of the touch panel 400 so as to surround the effective touch area of the capacitance-type touch panel 400 as shown in FIG. 7 and FIG. 8 in the embodiment.

Accordingly, the capacitance value between the electrodes at a portion of the shielding conductive film 38 becomes constant. Even if the thickness of the interval layer 34 is changed, the measured value of the capacity between the electrodes is not reacted and false operations can be prevented.

It should be noted that FIG. 7 is a cross-sectional view for showing an adhesion state between the front panel 12 and the capacitance-type touch panel 400 in the display device having a touch panel according to the embodiment of the present invention, and FIG. 8 is a diagram for showing an electrode pattern of the capacitance-type touch panel 400 according to the embodiment of the present invention.

In FIG. 7, the reference numerals 37 and 38 denote a protective layer and a shielding conductive film (for example, a grounded transparent conductive film (ITO)), respectively. It should be noted that the shielding conductive film 38 is coupled to, for example, one of the connecting terminals 7 of the flexible print substrate 72, and ground potential is supplied to the shielding conductive film 38.

Further, as shown in FIG. 8, the shielding conductive film 38 overlaps the peripheral portions of the effective touch area AR in planar view. Here, a slit 8 is formed in the shielding conductive film 38 and the shielding conductive film 38 is formed in a loop shape to be prevented from functioning as an antenna.

It should be noted that in a state where the shielding conductive film 38 overlaps the peripheral portions of the effective touch area AR, end portions of the shielding conductive film 38 where the peripheral portions of the effective touch area AR of the touch panel 400 overlap are desirably positioned in an area (area W1 shown in FIG. 8) of 3 mm to 5 mm at the peripheral portions of the effective touch area AR of the touch panel 400 in planar view.

Further, in a state where the shielding conductive film 38 overlaps the peripheral portions of the effective touch area AR, the end portions of the shielding conductive film 38 where the peripheral portions of the effective touch area AR of the touch panel 400 overlap are desirably positioned within a range (range W2 shown in FIG. 7) of 3 mm to 5 mm from the second adhesives 502 in planar view.

Figure 9:
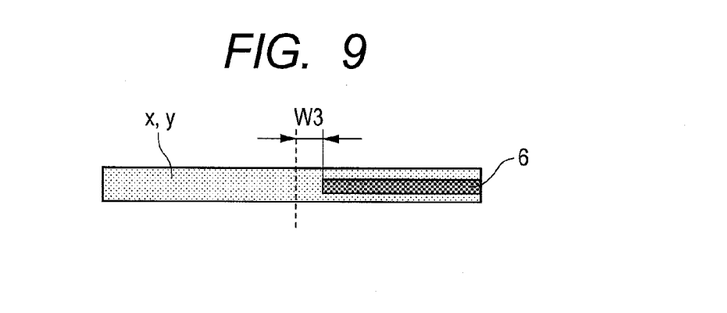
FIG. 9 is a diagram for explaining a shield electrode in the display device having a touch panel according to the embodiment of the present invention

FIG. 9 is a diagram for explaining a connection state between the wirings 6 and the electrodes (X-electrodes and Y-electrodes).

In general, the wiring 6 is configured using a transparent conductive film (ITO) configuring electrodes (X-electrodes and Y-electrodes) and a metal film formed on the transparent conductive film (ITO).

In such a case, in a state where the shielding conductive film 38 overlaps the peripheral portions of the effective touch area AR, the end portions of the shielding conductive film 38 where the peripheral portions of the effective touch area AR of the touch panel 400 overlap are desirably positioned within a range (range W3 shown in FIG. 9) of 3 mm to 5 mm from the connection position between the transparent conductive film (ITO) and the metal film in planar view.

Hereinafter, an electrode pattern of the capacitance-type touch panel shown in FIG. 8 will be described.

Figure 10:
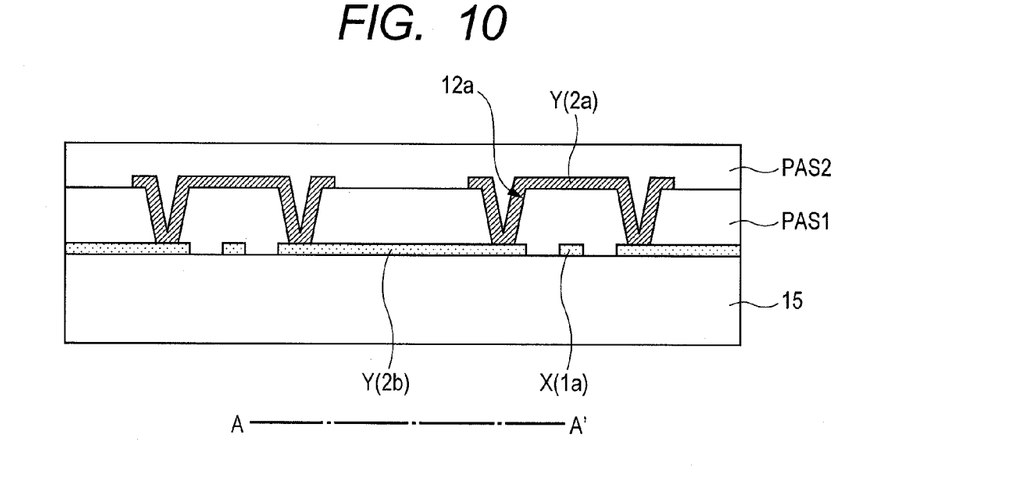
FIG. 10 is a cross-sectional view for showing a cross-sectional structure taken along the line A-A' of FIG. 8.
Figure 11:
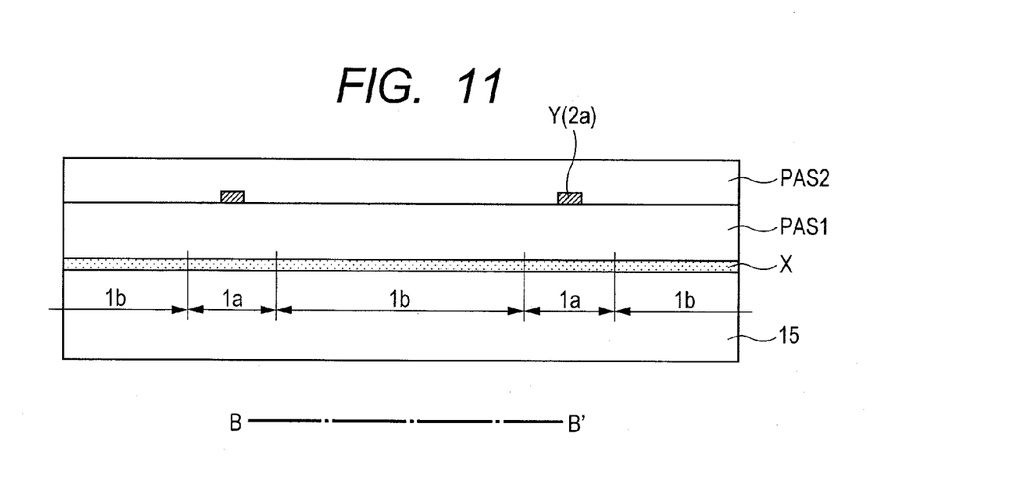
FIG. 11 is a cross-sectional view for showing a cross-sectional structure taken along the line B-B' of FIG. 8.

Each of FIG. 10 and FIG. 11 is a cross-sectional view for showing a cross-sectional structure of the capacitance-type touch panel shown in FIG. 8. FIG. 10 is a cross-sectional view for showing a cross-sectional structure taken along the line A-A' of FIG. 8, and FIG. 11 is a cross-sectional view for showing a cross-sectional structure taken along the line B-B' of FIG. 8.

The capacitance-type touch panel shown in FIG. 8 includes plural X-electrodes that extend in a second direction (for example, Y-direction) and are arranged in parallel at predetermined arrangement pitches in a first direction (for example, X-direction) intersecting with the second direction on the surface of the touch panel substrate 15 on the viewer side, and plural Y-electrodes that extend in the first direction while intersecting with the plural X-electrodes and are arranged in parallel at predetermined arrangement pitches in the second direction. As the touch panel substrate 15, for example, a transparent insulating substrate such as glass is used.

Each of the plural X-electrodes are formed in an electrode pattern in which thin line portions 1a and pad portions 1b whose widths are larger than those of the thin line portions 1a are alternately arranged in the second direction. Each of the plural Y-electrodes are formed in an electrode pattern in which thin line portions 2a and pad portions 2b whose widths are larger than those of the thin line portions 2a are alternately arranged in the first direction.

An area where the plural Y-electrodes and X-electrodes are arranged serves as the effective touch area AR, and plural wirings 6 that are electrically coupled to the plural Y-electrodes and X-electrodes are arranged around the effective touch area AR as shown in FIG. 8.

The plural X-electrodes are arranged on the surface of the touch panel substrate 15 on the viewer side. The pad portions 2b of the plural Y-electrodes are formed separately from the X-electrodes on the surface of the touch panel substrate 15 on the viewer side.

The thin line portions 2a of the plural Y-electrodes are arranged on an insulating film (PAS1) formed on the surface of the touch panel substrate 15 on the viewer side. It should be noted that the thin line portions 2a of the plural Y-electrodes are covered with a protective film (PAS2) formed thereon. Here, the protective film (PAS2) can be used as a protective layer 37.

Each of the thin line portions 2a of the Y-electrodes intersects with each of the thin line portions 1a of the X-electrodes in planar view. Each of the thin line portions 2a is electrically coupled to two adjacent pad portions 2b sandwiching the thin line portion 2a through a contact hole 12a formed at the insulating film (PAS1) as an interlayer insulating film between the thin line portion 2a of the Y-electrode and the thin line portion 1a of the X-electrode.

In planar view, each pad portion 2b of the Y-electrodes is arranged between two adjacent thin line portions 1a of the X-electrodes and each pad portion 1b of the X-electrodes is arranged between two adjacent thin line portions 2a of the Y-electrodes.

The plural X-electrodes and Y-electrodes are made of transparent conductive material such as Indium Tin Oxide (ITO) with high permeability. In addition, the wiring 6 is configured using, for example, a transparent conductive layer of a lower layer made of transparent conductive material such as Indium Tin Oxide (ITO) and a metal layer of an upper layer made of silver alloy material.

Figure 12:
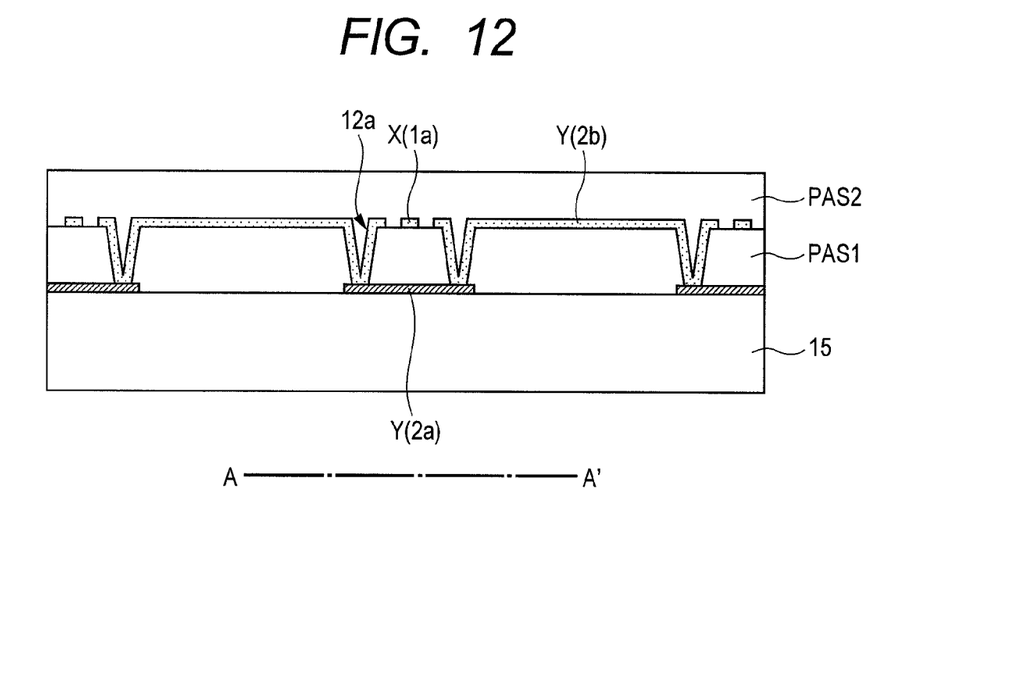
FIG. 12 is a cross-sectional view for showing a cross-sectional structure of another example of the capacitance-type touch panel shown in FIG. 8 and for showing a cross-sectional structure taken along the line A-A' of FIG. 8.
Figure 13:
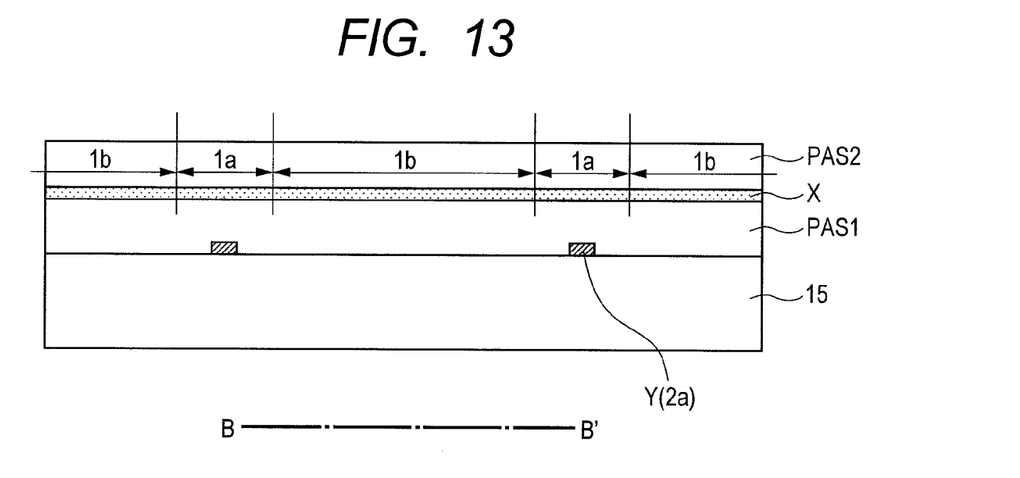
FIG. 13 is a cross-sectional view for showing a cross-sectional structure of still another example of the capacitance-type touch panel shown in FIG. 8 and for showing a cross-sectional structure taken along the line B-B' of FIG. 8.

Each of FIG. 12 and FIG. 13 is a cross-sectional view for showing a cross-sectional structure of another example of the capacitance-type touch panel shown in FIG. 8. FIG. 12 is a cross-sectional view for showing a cross-sectional structure taken along the line A-A' of FIG. 8, and FIG. 13 is a cross-sectional view for showing a cross-sectional structure taken along the line B-B' of FIG. 8.

In the capacitance-type touch panel shown in each of FIG. 12 and FIG. 13, the thin line portions 2a of the plural Y-electrodes are arranged on the surface of the touch panel substrate 15 on the viewer side, and the thin line portions 1a of the plural X-electrodes and the pad portions 2b of the plural Y-electrodes are formed on the insulating film (PAS1). It should be noted that the thin line portions 1a and the pad portions 1b of the plural X-electrodes and the pad portions 2b of the plural Y-electrodes are covered with the protective film (PAS2) formed thereon. Here, the protective film (PAS2) can be used as the protective layer 37.

Each of the thin line portions 2a of the Y-electrodes intersects with each of the thin line portions 1a of the X-electrodes in planar view. Each of the thin line portions 2a is electrically coupled to two adjacent pad portions 2b sandwiching the thin line portion 2a through the contact hole 12a formed at the insulating film (PAS1) as an interlayer insulating film between the thin line portion 2a of the Y-electrode and the thin line portion 1a of the X-electrode.

In planar view, each pad portion 2b of the Y-electrodes is arranged between two adjacent thin line portions 1a of the X-electrodes and each pad portion 1b of the X-electrodes is arranged between two adjacent thin line portions 2a of the Y-electrodes.

The plural X-electrodes and Y-electrodes are made of transparent conductive material such as Indium Tin Oxide (ITO) with high permeability. In addition, the wiring 6 is configured using, for example, a transparent conductive layer of a lower layer made of transparent conductive material such as Indium Tin Oxide (ITO) and a metal layer of an upper layer made of silver alloy material.

Figure 14:
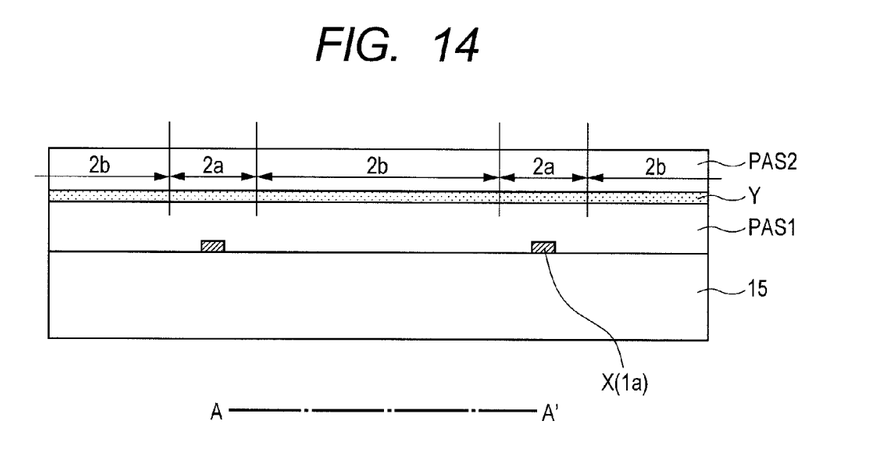
FIG. 14 is a cross-sectional view for showing a cross-sectional structure of still another example of the capacitance-type touch panel shown in FIG. 8 and for showing a cross-sectional structure taken along the line A-A' of FIG. 8.
Figure 15:
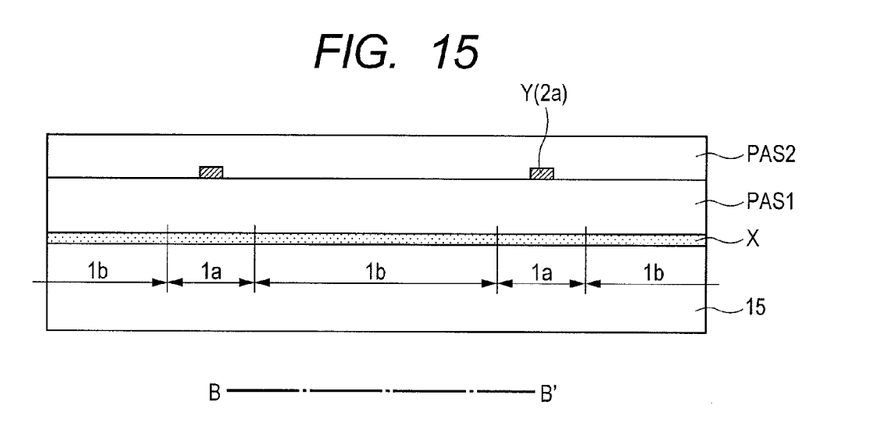
FIG. 15 is a cross-sectional view for showing a cross-sectional structure of still another example of the capacitance-type touch panel shown in FIG. 8 and for showing a cross-sectional structure taken along the line B-B' of FIG. 8.

Each of FIG. 14 and FIG. 15 is a cross-sectional view for showing a cross-sectional structure of still another example of the capacitance-type touch panel shown in FIG. 8. FIG. 14 is a cross-sectional view for showing a cross-sectional structure taken along the line A-A' of FIG. 8, and FIG. 15 is a cross-sectional view for showing a cross-sectional structure taken along the line B-B' of FIG. 8.

In the capacitance-type touch panel shown in each of FIG. 14 and FIG. 15, the thin line portions 1a and the pad portions 1a of the plural X-electrodes are arranged on the surface of the touch panel substrate 15 on the viewer side, and the thin line portions 2a and the pad portions 2b of the plural Y-electrodes are formed on the insulating film (PAS1). It should be noted that the thin line portions 2a and the pad portions 2b of the plural Y-electrodes are covered with the protective film (PAS2) formed thereon. Here, the protective film (PAS2) can be used as the protective layer 37.

In the capacitance-type touch panel shown in each of FIG. 14 and FIG. 15, the X-electrodes and the Y-electrodes are formed on the different layers, and the thin line portions 2a of the Y-electrodes intersect with the thin line portions 1a of the X-electrodes in planar view.

In planar view, each pad portion 2b of the Y-electrodes is arranged between two adjacent thin line portions 1a of the X-electrodes and each pad portion 1*b* of the X-electrodes is arranged between two adjacent thin line portions 2*a* of the Y-electrodes.

The plural X-electrodes and Y-electrodes are made of transparent conductive material such as Indium Tin Oxide (ITO) with high permeability. In addition, the wiring 6 is configured using, for example, a transparent conductive layer of a lower layer made of transparent conductive material such as Indium Tin Oxide (ITO) and a metal layer of an upper layer made of silver alloy material.

As described above, the invention achieved by the inventors has been described in detail on the basis of the embodiment. However, it is obvious that the present invention is not limited to the embodiment, and can be variously changed without departing from the scope of the present invention.

What is claimed is:

1. A display device having a touch panel comprising:
   a display panel;
   a capacitance-type touch panel arranged on the display panel; and
   a front panel arranged on the capacitance-type touch panel;
   wherein the capacitance-type touch panel includes a plurality of X-electrodes and Y-electrodes;
   wherein the capacitance-type touch panel and the front panel are attached to each other at peripheral portions of the capacitance-type touch panel using adhesives;
   wherein a conductive film that is provided so as to surround an effective touch area of the capacitance-type touch panel is provided on the uppermost layer of the capacitance-type touch panel;
   wherein predetermined electric potential is supplied to the conductive film;
   wherein the conductive film overlaps peripheral portions of the effective touch area of the capacitance-type touch panel in planar view; and
   wherein end portions of the conductive film where the peripheral portions of the effective touch area of the capacitance-type touch panel overlap are positioned within a range of 3 mm to 5 mm of the peripheral portions of the effective touch area of the capacitance-type touch panel in planar view.

2. The display device having a touch panel according to claim 1, wherein ground electric potential is supplied to the conductive film.

3. The display device having a touch panel according to claim 1, wherein the X-electrodes and the Y-electrodes intersect with each other through a first insulating layer, pad portions and thin line portions are formed so as to be alternately arranged in extending directions of the X-electrodes and the Y-electrodes, and the pad portions of the X-electrodes and the pad portions of the Y-electrodes are arranged so as not to overlap each other in planar view.

4. The display device having a touch panel according to claim 1, wherein the X-electrodes and the Y-electrodes intersect with each other at crossed portions through the first insulating layer, the pad portions and the thin line portions are formed so as to be alternately arranged in the extending directions of the X-electrodes and the Y-electrodes, and the pad portions of the X-electrodes and the pad portions of the Y-electrodes are arranged so as not to overlap each other in planar view.

5. The display device having a touch panel according to claim 1,
   wherein wirings coupled to the plurality of X-electrodes and Y-electrodes are formed outside the effective touch area of the capacitance-type touch panel, and
   wherein the end portions of the conductive film where the peripheral portions of the effective touch area of the capacitance-type touch panel overlap are positioned within a range of 5 mm from connection portions between the plurality of X-electrodes and Y-electrodes and the wirings in planar view.

6. The display device having a touch panel according to claim 1, wherein the end portions of the conductive film where the peripheral portions of the effective touch area of the capacitance-type touch panel overlap are positioned within a range of 3 mm to 5 mm from the adhesives in planar view.

7. The display device having a touch panel according to claim 1, wherein a slit is provided across the conductive film.

* * * * *